United States Patent
Britton

(10) Patent No.: US 6,635,217 B1
(45) Date of Patent: Oct. 21, 2003

(54) CONTAINERS

(76) Inventor: Charles Jonathan Britton, 19, High Street, Avening, Tetbury, Gloucestershire GL8 8NF (GB)

( * ) Notice: Subject to any disclaimer, the term of this patent is extended or adjusted under 35 U.S.C. 154(b) by 0 days.

(21) Appl. No.: 09/077,516

(22) PCT Filed: Nov. 29, 1996

(86) PCT No.: PCT/GB96/02941

§ 371 (c)(1), (2), (4) Date: Jan. 12, 1999

(87) PCT Pub. No.: WO97/19802

PCT Pub. Date: Jun. 5, 1997

(30) Foreign Application Priority Data

Nov. 30, 1995 (GB) ............................................. 9524554

(51) Int. Cl.$^7$ ........................... B29C 49/54; B65D 90/02
(52) U.S. Cl. ...................... 264/532; 264/531; 264/534; 264/318; 215/373
(58) Field of Search ................. 264/531, 532, 264/534, 318; 425/525; 215/373

(56) References Cited

U.S. PATENT DOCUMENTS

| 3,843,005 A | * | 10/1974 | Uhlig | ........................ 264/534 |
|---|---|---|---|---|
| 3,949,034 A | | 4/1976 | Uhlig | |
| 4,036,926 A | * | 7/1977 | Chang | ........................ 264/534 |
| 4,380,134 A | | 4/1983 | Taluba et al. | |
| 4,769,206 A | * | 9/1988 | Reymann et al. | ........... 264/534 |
| 5,122,325 A | * | 6/1992 | Bartley et al. | .............. 264/531 |
| 5,122,327 A | | 6/1992 | Spina et al. | |
| 5,403,179 A | * | 4/1995 | Ramsey | ...................... 264/318 |

FOREIGN PATENT DOCUMENTS

| EP | 0 306 923 | 3/1989 |
|---|---|---|
| WO | WO 89/07554 | 8/1989 |
| WO | WO 95/15250 | 6/1995 |

* cited by examiner

Primary Examiner—Suzanne E. McDowell
(74) Attorney, Agent, or Firm—Flynn, Thiel, Boutell & Tanis, P.C.

(57) ABSTRACT

A container is made in two stages from material such as thermoplastics that is deformable when heated. In the first stage a preform (1) is injection moulded, the mould parts easily releasing a tubular body (2) with a closed end. In the second stage the still heated preform (1) is blow moulded, possibly with some preliminary mechanical stretching, the blow pin being applied to the open end. The closed end of the body is stretched over a multi-part section (7, 8) of the mould which shapes the base of the container into an indent with an undercut formation, the cross section being generally omega-shaped. The multi-part mould section has a central tapered core (8) surrounded by an array of segments (7), the core (8) being fully inserted to spread the segments (7) for moulding, and being retracted to allow the segments (7) to close up and release the container after moulding. The divisions (12) between segments (7) produce ribs in the indent which provide added strength.

9 Claims, 2 Drawing Sheets

CONTAINERS

This invention relates to containers, and particularly to plastics containers capable of withstanding substantial internal pressure.

Aerosol containers and other vessels under pressure have largely been made of metal, although recently plastics ones have been introduced. However, they have usually been of two-piece construction, the base being bonded to the rest of the body.

The favoured shape for such a container is cylindrical with an indented base, often known as a champagne base, since champagne bottles, which are under pressure when charged, have a cone shaped indent at the bottom.

While this shape can be applied to a plastics container, it has been found that even better resistance to internal pressure can be achieved by making the indent, in axial section of the container, generally the shape of the Greek letter Omega. In other words, there is an undercut around the indent, but this of course poses problems in moulding.

It is the aim of this invention to answer these problems.

According to one aspect of the present invention there is provided a method of making a container with an undercut re-entrant base, the material of the container being susceptible to deformation when heated, wherein the base portion of an embryo container, at an elevated temperature, is expanded against a multi-part mould having at least three segments surrounding a tapered core movable to wedge the segments from a closely packed array to a mutually spread array, the undercut re-entrant base being shaped by the segments when spread, and being released when the segments are closely packed.

The expansion will preferably be achieved at least primarily by blow moulding, although the embryo container could initially be expanded in the basewards direction towards said core and segments by mechanical means inserted through an opening at the end opposite the base. This opening would subsequently receive the blow pin.

In the usual form the container in both embryo and finished form will be substantially a body of revolution, the core being co-axial therewith, and the segments all being similar with radial sides abutting when close-packed.

Preferably the segments will shape the re-entrant base into a profile of n-shape.

At least part of the edges of the segments which are exposed to the material of the container may be chamfered or bevelled to create channels which form ribs projecting outwardly from the re-entrant base surface.

For a better understanding of the invention, one embodiment will now be described, by way of example, with reference to the accompanying drawings, in which.

Figure 1:
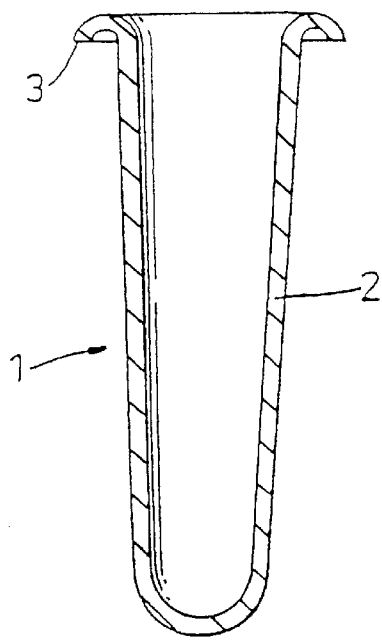
FIG. 1 is an axial section of a preform for a pressurised container.

In FIG. 1, a preform or embryo container 1 is generally test tube shaped, but with a slightly tapering body 2 narrowing towards its closed lower end, and with an outwardly projecting flange 3 at its upper end. By virtue of its shape, it can be readily formed by injection moulding, the mould only requiring two parts which can be axially separated to release the preform.

Figure 2:
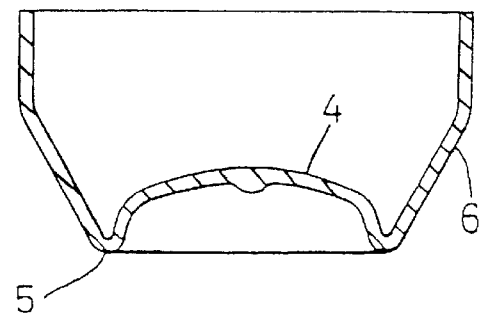
FIG. 2 is an axial section of the base of a known container.

To make a container capable of withstanding internal pressure, this may be expanded, for example by blow moulding, and its base may be developed into the shape shown in FIG. 2 where there is a central domed indent 4 merging at a rim 5, on which the container can stand, into an outwardly sloping lower portion of the container wall 6. Again, the shape is such that, with no undercut formations, release from a mould presents no problems.

However, for improved resistance to internal pressure, it is beneficial to expand the dome 4 laterally above the rim 5 so that there is an annular undercut formation.

Figure 3:
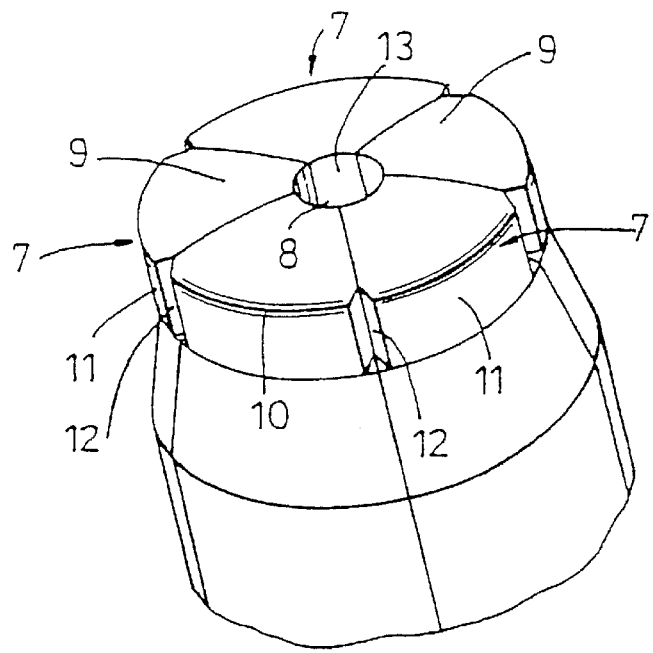
FIG. 3 is a perspective view of part of a mould for making an improved container.
Figure 4:
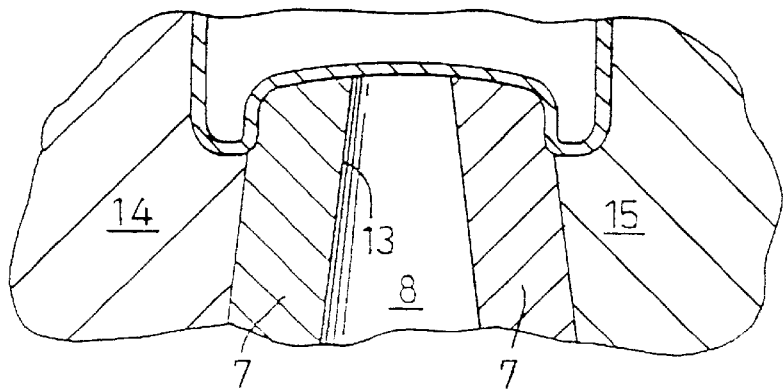
FIG. 4 is an axial section of part of that mould and the base of a container formed in it.

Referring to FIG. 3, the base insert or punt of a blow mould consists of five identical segments 7 in an annular array around a tapered core 8. Each segment, when viewed endwise, resembles the sector of a circle with the apex removed by an arcuate cut, and each partly domed end face 9 has a rounded outer shoulder 10 which develops into flanks 11 inclining back towards the common axis. At the circumferential ends of these flanks there are chamfers or bevels 12 so that when the segments 7 are closed together as shown they form V-section notches. Beyond the flanks 11, the segments slope outwardly again. They will be arranged to be movable radially so that they can spread from the closely packed position shown with radial sides abutting to be evenly spaced apart around the common axis. This can be achieved by the tapered core 8 which fits in a complementary central passage 13 formed by the segments 7, as best seen in FIG. 4.

The preform 1 is placed in a blow mould having this base insert and two halves 14 and 15 while still hot and is then expanded in a known way. This may be done entirely by pressurised air, or there may be preliminary mechanical stretching by a member introduced through the mouth of the body 2. The plastics material flows against the wall of the mould cavity and assumes its shape. The segments 7 are spread by upward movement of the core 8 until its end is flush with the faces 9. The timing of this will depend on the material used, the thickness of the preform wall and the amount of stretch to be imparted. In any event, the plastics material will deform into the gaps between the segments 7, this deformation being particularly pronounced at the chamfers 12. The ribs so formed are not just features incidental to the moulding process: they provide reinforcement of the base. When the material has cooled, the core 8 is withdrawn and the segments 7 are closed together. This brings the shoulders 10 radially free of the undercut formation of n-shape created at the base of the container, and so release is easily achieved.

It will be understood that there can be any number of segments with a minimum of three to achieve the final clearance. An odd number is preferred so that there are no complete diametral ribs, and usually five will be the optimum.

Figure 5:
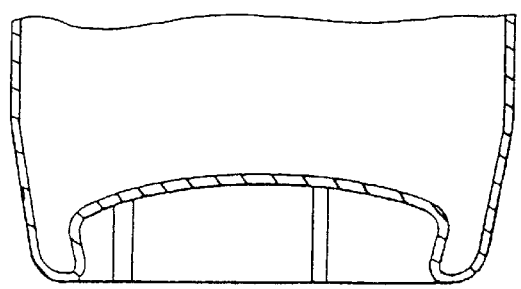
FIG. 5 is an axial section of the base of the container removed from the mould.
Figure 6:
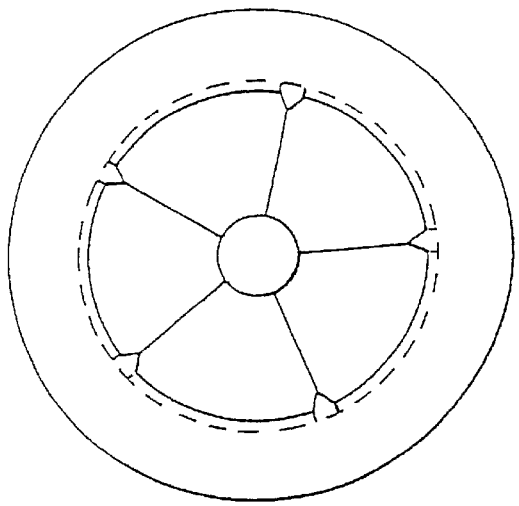
FIG. 6 is an underneath plan view of the container.
Figure 7:
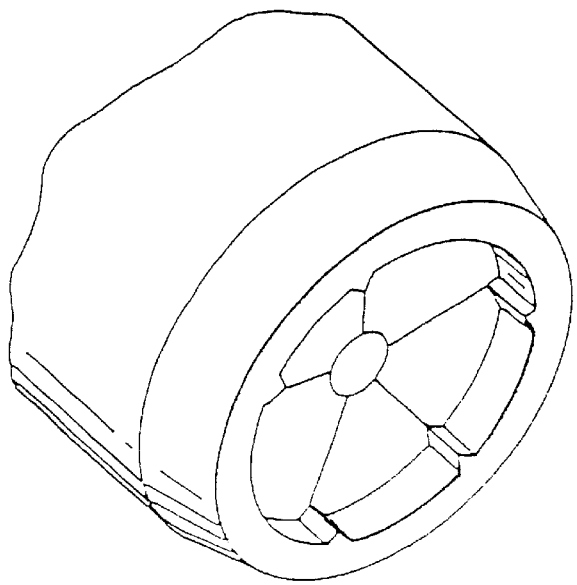
FIG. 7 is a perspective view showing the underside of the container.

The lower end of the container so produced is illustrated in FIGS. 5, 6 and 7.

The material used may be polyvinyl chloride, high density polythene, polypropylene, acrylic or polycarbonate. Since the method enables stronger, thinner and lighter pressure resistant containers to be achieved, other more expensive plastics materials may be considered, such as polyethylene terepthalate (P.E.T), polyethylene napthalate (P.E.N.) and copolymers of these two materials in crystallised or amorphous form. It should also be possible to apply the method to glass containers, and it may even be feasible with certain metals, such as aluminium.

While blow moulding is expected to be the preferred method of expansion, aided by mechanical stretching for large containers, it may be possible to achieve the same effect by suction moulding.

What is claimed is:

1. A method of making a container with an undercut re-entrant base, the material of the container being susceptible to deformation when heated, the method comprising the steps of:

expanding the base portion of an embryo container, at an elevated temperature, against a multi-part mould having at least three segments surrounding a tapered core;

moving the core to wedge the segments laterally from a closely packed array to a mutually spread array thereby to form the undercut re-entrant base;

retracting the core, returning the segments to a closely packed array and releasing the container therefrom;

wherein the container in both embryo and finished form is substantially a body of revolution, the core is co-axial therewith, and the segments are all similar with radial sides abutting when close-packed.

2. A method of making a container with an undercut re-entrant base, the material of the container being susceptible to deformation when heated, the method comprising the steps of:

expanding the base portion of an embryo container, at an elevated temperature, against a multi-part mould having at least three segments surrounding a tapered core;

moving the core to wedge the segments laterally from a closely packed array to a mutually spread array thereby to form the undercut re-entrant base into a profile of Ω-shape;

retracting the core, returning the segments to a closely packed array and releasing the container therefrom.

3. A method of making a container as claimed in claim 2, wherein the expansion is achieved at least primarily by blow moulding.

4. A method of making a container as claimed in claim 2, wherein, before the expansion step, the embryo container is extended towards the core and segments by a mechanical member inserted through an opening at the end opposite the base.

5. A method of making a container as claimed in claim 2, wherein the surfaces of the segments against which the material of the container is expanded are delineated by joint lines when the segments are closely packed, chamfering or bevelling of the segments along at least part of those lines creating channels into which the materials enter to form ribs projecting outwardly from the re-entrant base surface, the ribs enlarging as the segments are spread and, where there is no chamfering or bevelling, further ribs being created at the joint lines as the segments move apart.

6. A method of making a container with an undercut re-entrant base, the material of the container being susceptible to deformation when heated, the method including the steps of;

expanding the base portion of an embryo container, at an elevated temperature, against a multipart mould having at least three segments surrounding a tapered core;

moving the core to wedge the segments laterally from a closely packed array to a mutually spread array thereby finally to form the undercut re-entrant base with a Ω-shape;

retracting the core, returning the segments to a closely packed array, and releasing the container therefrom.

7. A container comprising:

a body portion; and a base portion, wherein the base portion has a U-shaped indent, the indent having a lower portion and an upper portion, and wherein a radius of the upper portion is greater than a radius of the lower portion.

8. The container of claim 7, wherein the undercut is formed by heating an embryo container and expanding the base portion with a multi-part mould having at least three segments surrounding a tapered core and moving the core to wedge the segments laterally from a closely packed array to a mutually spread array thereby to form the undercut base.

9. The container of claim 7, further comprising ribs projecting away from a surface of the base portion.

* * * * *